J. A. WOODBURY.
CAR WHEEL.

No. 373,213.  Patented Nov. 15, 1887.

WITNESSES.
E. A. Hemmenway
Benj. Andrews Jr.

INVENTOR.
James A. Woodbury
By N. C. Lombard
ATTORNEY.

UNITED STATES PATENT OFFICE.

JAMES A. WOODBURY, OF WINCHESTER, MASSACHUSETTS.

CAR-WHEEL.

SPECIFICATION forming part of Letters Patent No. 373,213, dated November 15, 1887.

Application filed April 25, 1878.

*To all whom it may concern:*

Be it known that I, JAMES A. WOODBURY, of Winchester, in the county of Middlesex and State of Massachusetts, have invented certain new and useful Improvements in Car-Wheels, of which the following, taken in connection with the accompanying drawings, is a specification.

This invention relates to improvements in elastic car-wheels.

The object of the invention is to provide an elastic car-wheel which will be safe and durable.

The invention consists in certain new organizations of parts, as hereinafter described and claimed, whereby the object sought is obtained in an economical manner.

Figure 3:
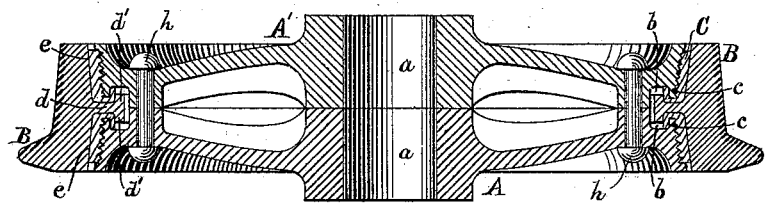
Figure 2:
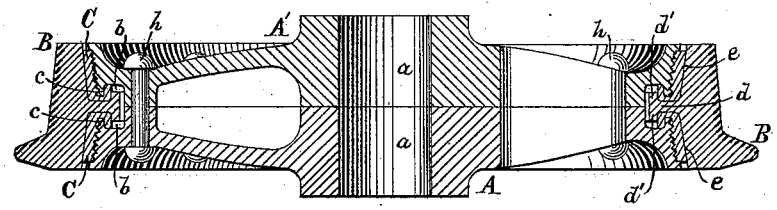
Figure 1:
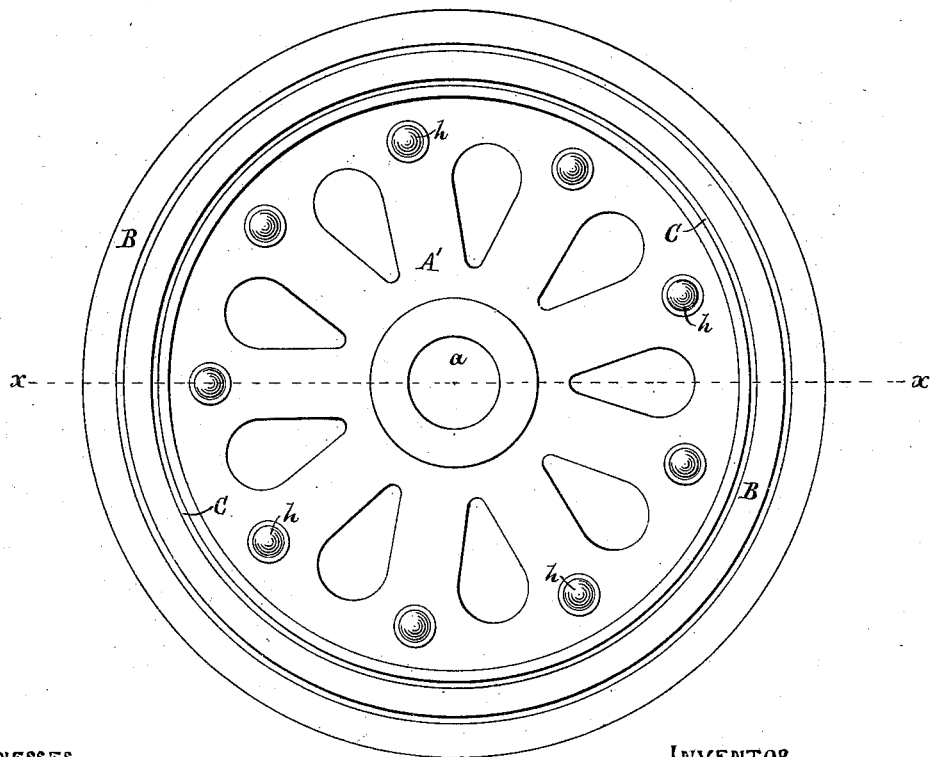

Figure 1 of the drawings is a side elevation of a wheel embodying my invention. Fig. 2 is a section of the same on line $x\ x$ on Fig. 1, the wheel here shown being a spoke wheel. Fig. 3 is a similar section, illustrating my invention as applied to a plate wheel.

A and A' are the two parts of the hub or central portion of the wheel, made of cast-iron or other suitable metal, each provided with a central hole, $a$, to receive the axle, and having its outer periphery turned to a true circle in the form of a frustum of a cone and roughened by turning fine V-grooves therein, as shown. Around the outer portion of the inner radial face of each of said parts A and A' is formed the annular groove $b$, the outer wall of which is formed by the annular lip $c$, as shown in Figs. 2 and 3. That portion of the inner radial face of each of the parts A A' within the annular groove $b$ is turned to a true level or even surface, so that when said parts are bolted or riveted together they shall bear firmly upon each other, metal to metal, without springing or straining either of the parts.

B is the tire, made of steel and provided upon its inner periphery with the inwardly-projecting rib $d$, made preferably of a T shape in cross-section by forming upon its inner edge the two annular lips $d'\ d'$, as shown in Figs. 2 and 3, and also provided on its inner periphery with the two annular inclined bearing-surfaces $e\ e$, turned smooth and to true circles, and also having its tread-surface turned to a true circle concentric with said inner bearing-surfaces, whereby the wheel is rendered much smoother-running than the cast-iron chilled wheels now in use.

C C are two packing-rings of rubber, placed between the outer peripheries of the hub portions A and A' and the inclined bearing-surfaces $e\ e'$, and extending around the annular rib or lip $c\ c$ and between it and the rib $d$ and annular lip $d'$. One of the packing-rings C is placed in position on the hub portion A. The tire B is then dropped over the packing and portion A. The other packing-ring C is in like manner placed in position upon the hub portion A', when said hub portion and packing are placed in position within the tire, and the two hub portions A and A' are then forced into the tire and toward each other by applying thereto a heavy pressure—say about seventy tons—compressing the rubber packing till the parts A A' are brought into actual contact, when they are secured together by means of the rivets $h\ h$, care being taken to so proportion the thickness of the rubber packing to the annular space between the outer conical surfaces of the hub portions and the inner inclined bearing-surfaces of the tire that when the two hub portions A A' are forced into actual contact with each other the rubber packing shall be compressed to the proper density to give the best practical results as regards elasticity and the durability of the wheel.

By this construction a wheel is produced that is perfectly round, true, and well balanced, by virtue of which properties it will run very much smoother and wear longer than the cast-iron chilled wheels heretofore in use, and at the same time cause very much less injury to the rails than is produced by an imperfect or unround wheel.

The rib $d$, provided with the annular lips $d'\ d'$, serves to prevent the tire from flying off in case of fracture.

The lips $d'\ d'$ may be dispensed with and the rivets $h\ h$, or a portion of them, may be passed through slotted holes in the rib $d$, to serve the same purpose of preventing the tire from flying off in case of fracture.

What I claim as new, and desire to secure by Letters Patent of the United States, is—

1. In a sectional car-wheel, the combination of two wheel-sections in apposition, constituting the body of the wheel, each section comprising a hub and a rim integrally connected, the inner faces of the two sections being in contact, bolts passing through said wheel-sections near the periphery of the wheel-body, a tire movable laterally on the wheel-sections, and an elastic packing interposed between said wheel-sections and the tire, substantially as described.

2. In a sectional car-wheel, the combination of two wheel-sections in apposition, constituting the body of the wheel, each section comprising a hub and a rim integrally connected, the inner faces of the two sections being in contact, said sections having a peripheral slot between them and inwardly-projecting lips opposite said slot, bolts passing through said wheel-sections near the periphery of the wheel-body, a tire movable laterally on the wheel-sections and provided on its inner periphery with a T-shaped rib entering said slot between said lips, and elastic packing interposed between said sections and tire, substantially as described.

3. In a sectional car-wheel, the combination of two sections in apposition, constituting the body of the wheel, said sections having a peripheral slot between them and inwardly-projecting lips opposite said slot, a tire provided on its inner periphery with a T-shaped rib entering said slot between said lips, and elastic packings interposed between said sections and tire, said packings extending into said slot between said rib and lips, substantially as described.

4. In a sectional car-wheel, the combination of two wheel-sections in apposition, constituting the body of the wheel, each section comprising a hub and a rim integrally connected, the inner faces of the two sections being in contact, said sections having a peripheral slot between them and inwardly-projecting lips opposite said slot, bolts passing through said wheel-sections near the periphery of the wheel-body, a tire movable laterally on the wheel-sections and provided on its inner periphery with a T-shaped rib entering said slot between said lips, and elastic packing extending into said slot between said rib and lip, substantially as described.

5. In a sectional car-wheel, the combination of two sections in apposition, constituting the body of the wheel, said sections having a peripheral slot between them and inwardly-projecting lips opposite the said slot, a tire movable laterally on the wheel-sections and provided on its inner periphery with a T-shaped rib entering said slot between the lips of said sections, and elastic packings interposed between said sections and tire, substantially as described.

6. In a sectional car-wheel, the combination of two sections in apposition, constituting the body of the wheel, said sections having beveled peripheries and being provided with annular lips on their inner faces near their peripheries, a tire provided with a central vertical rib extending inward between said lips, the inner periphery of said tire being flared on opposite sides of said rib, and packings between the beveled and flared peripheries, said packings extending inward between said lips and ribs, substantially as described.

7. In a sectional car-wheel, the combination of two sections constituting the body of the wheel, said sections having beveled peripheries and being provided with L-shaped annular recesses forming annular lips on their inner faces near their peripheries, a tire provided with a central inwardly-extending T-shaped rib which enters the T-shaped slot formed by the annular L-shaped recesses of the two adjacent sections, the inner periphery of said tire being flared on opposite sides of said rib, and packings between the beveled and flared peripheries, said packings extending inward between said lips and rib and outward between the flanges of the rib and the inner faces of said lips, substantially as described.

8. A sectional car-wheel whereof the periphery of the tired rim is beveled in opposite directions and the inner periphery of the tire correspondingly flared, one of said peripheries being roughened, and elastic packing being interposed between said peripheries, substantially as described.

Executed at Boston, Massachusetts, this 23d day of April, A. D. 1878.

JAMES A. WOODBURY.

Witnesses:
N. C. LOMBARD,
C. H. DODD.